(12) United States Patent
Sun et al.

(10) Patent No.: US 9,736,803 B2
(45) Date of Patent: Aug. 15, 2017

(54) CELL CONFIGURATION METHOD, SYNCHRONIZATION METHOD, USER EQUIPMENT, AND BASE STATION

(71) Applicant: Huawei Technologies Co., Ltd., Shenzhen, Guangdong (CN)

(72) Inventors: Jingyuan Sun, Shenzhen (CN); Liang Xia, Shenzhen (CN); Yongxing Zhou, Shenzhen (CN); Xiaotao Ren, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 306 days.

(21) Appl. No.: 14/487,911

(22) Filed: Sep. 16, 2014

(65) Prior Publication Data
US 2015/0003442 A1    Jan. 1, 2015

Related U.S. Application Data

(63) Continuation of application No. PCT/CN2013/072804, filed on Mar. 18, 2013.

(30) Foreign Application Priority Data

Mar. 16, 2012   (CN) .......................... 2012 1 0070828

(51) Int. Cl.
*H04J 3/06*       (2006.01)
*H04W 56/00*  (2009.01)
(Continued)

(52) U.S. Cl.
CPC ....... *H04W 56/0015* (2013.01); *H04L 5/0092* (2013.01); *H04W 16/02* (2013.01); *H04W 16/04* (2013.01); *H04W 72/042* (2013.01)

(58) Field of Classification Search
None
See application file for complete search history.

(56) References Cited

U.S. PATENT DOCUMENTS

2010/0238877 A1* 9/2010 Nam .................... H04L 5/0048
                                                                            370/329
2011/0158164 A1   6/2011 Palanki et al.
(Continued)

FOREIGN PATENT DOCUMENTS

CN           1279867 A      1/2001
CN        102378243 A      3/2012
(Continued)

OTHER PUBLICATIONS

"3$^{rd}$ Generation Partnership Project; Technical Specification Group Radio Access Network; Evolved Universal Terrestrial Radio Access (E-UTRA); Physical layer procedures (Release 10)," 3GPP TS 36.213, V10.5.0, pp. 1-125, 3$^{rd}$ Generation Partnership Project, Valbonne, France (Mar. 2012).
(Continued)

*Primary Examiner* — Otis L Thompson, Jr.
(74) *Attorney, Agent, or Firm* — Leydig, Voit & Mayer, Ltd.

(57) ABSTRACT

Embodiments of the present invention disclose a cell configuration method, a method for implementing synchronization between a user equipment and a base station, a user equipment, and a base station. The cell configuration method includes: determining, by a first base station corresponding to a first cell, system information of a second cell; and notifying, by the first base station, a second base station corresponding to the second cell of the system information, so that the second base station sends and receives signals according to the system information. According to the solutions provided in the embodiments of the present invention, system information of a cell may be dynamically or
(Continued)

semi-statically adjusted according to user equipment distribution and service distribution, so that network resources can be better provided for a user equipment that needs them, a capability of serving the user equipment is improved.

16 Claims, 8 Drawing Sheets

(51) Int. Cl.
*H04W 16/02* (2009.01)
*H04W 16/04* (2009.01)
*H04L 5/00* (2006.01)
*H04W 72/04* (2009.01)

(56) References Cited

U.S. PATENT DOCUMENTS

| | | | | |
|---|---|---|---|---|
| 2011/0222513 A1* | 9/2011 | Zhou | ............ | G01S 5/10 |
| | | | | 370/336 |
| 2012/0120842 A1* | 5/2012 | Kim | ............ | H04B 7/024 |
| | | | | 370/252 |
| 2012/0183028 A1* | 7/2012 | Han | ............ | H04B 7/022 |
| | | | | 375/222 |
| 2012/0257515 A1* | 10/2012 | Hugl | ............ | H04W 24/10 |
| | | | | 370/252 |
| 2014/0179293 A1* | 6/2014 | Li | ............ | H04W 4/08 |
| | | | | 455/416 |
| 2014/0185528 A1* | 7/2014 | Shimezawa | ............ | H04W 52/42 |
| | | | | 370/328 |

FOREIGN PATENT DOCUMENTS

| | | |
|---|---|---|
| WO | WO 9930519 A1 | 6/1999 |
| WO | WO 2011119005 A2 | 9/2011 |
| WO | WO 2011162660 A1 | 12/2011 |

OTHER PUBLICATIONS

"3$^{rd}$ Generation Partnership Project; Technical Specification Group Radio Access Network; Evolved Universal Terrestrial Radio Access (E-UTRA); Radio Resource Control (RRC); Protocol specification (Release 10)," 3GPP TS 36.331, V10.5.0, pp. 1-302, 3$^{rd}$ Generation Partnership Project, Valbonne, France (Mar. 2012).

"Remaining Issues on CSI-RS in Rel-10," 3GPP TSG RAN WG1 Meeting #63bis, Dublin, Ireland, R1-110396, 3$^{rd}$ Generation Partnership Project, Valbonne, France (Jan. 17-21, 2011).

* cited by examiner

CELL CONFIGURATION METHOD, SYNCHRONIZATION METHOD, USER EQUIPMENT, AND BASE STATION

CROSS-REFERENCE TO RELATED APPLICATION

This application is a continuation of International Patent Application No. PCT/CN2013/072804, filed on Mar. 18, 2013, which claims priority to Chinese Patent Application No. 201210070828.5, filed on Mar. 16, 2012, both of which are hereby incorporated by reference in their entireties.

TECHNICAL FIELD

The present invention relates to the field of communications technologies, and in particular, to a cell configuration method, a method for implementing synchronization between a user equipment and a base station, a user equipment, and a base station.

BACKGROUND

Most of existing wireless communication systems adopt cellular systems. In a cellular system, the whole system is divided into multiple cells, and the same time-frequency resources may be used in each cell or used in multiple cells that are separated from each other at a certain distance. When a whole network is divided into multiple cells, network planning needs to be performed. During the network planning, a position of each base station in the network, the number of cells corresponding to a base station, a cell identity (ID) of each cell, and other system information (including a carrier frequency, bandwidth, and the like) used by each cell need to be planned.

After the network planning is complete, each base station sends signals according to the cell system information that has been planned. When accessing the network, each user equipment needs to search for a cell and access the cell. Then, the user equipment reads other relevant system information of the cell from a broadcast channel and then establishes a communication connection with a base station according to the cell system information, such as a cell ID/carrier frequency of a carrier/system bandwidth/the number of antennas.

However, in a wireless communication system, after the network planning is complete, each cell ID and corresponding system information are fixed. Regardless of changes in user equipment distribution and service requirement distribution in a practical environment, only a cell system planned during the network planning can be used to provide a service for a user equipment, and cell system information in a network cannot be adjusted due to a change in user equipment distribution or service requirement distribution, so as to adjust a cell to adapt to the change.

For example, when one or more new cells are added to a network, network replanning needs to be performed for the whole network to allocate a cell ID to the new cell. If the new cell is a temporary cell or the cell position frequently changes, network replanning needs to be performed for each change. As a result, complexity of network maintenance increases. However, if the new cell is allowed to randomly select a cell ID by itself, it is likely to cause relatively large inter-cell interference or a situation that is not applicable to service distribution in the network.

For another example, in a network including a macro cell and a micro cell, if a main requirement of the network is to obtain more control channel capacities, the macro cell and the micro cell may be allowed to use different cell IDs. If the main requirement of the network is to obtain better inter-cell collaboration, the macro cell and the micro cell may be allowed to use a same cell ID. When the main requirement in the network changes, because a cell ID has been planned during the network planning and cannot be changed, the existing network cannot accommodate a change in the requirement.

In addition, when establishing a communication connection with a cell, a user equipment needs to establish initial downlink synchronization and synchronization tracking with a base station and receives, based on the synchronization, data sent by the base station, such as data of a physical downlink shared channel (Physical Downlink Shared Channel, PDSCH). In an uplink, the base station needs to indicate a certain timing advance (Timing Advance, TA) for the user equipment, and the user equipment determines an uplink transmission moment according to accumulation of TAs received from the base station, a predefined offset value, and the downlink synchronization.

In dynamic node selection (Dynamic Point Selection, DPS) transmission mode, the user equipment needs to establish synchronization with multiple nodes. However, the user equipment does not know reference signals according to which synchronization is performed, synchronization according to which a PDSCH is received, and synchronization according to which the uplink transmission moment is determined.

SUMMARY

Embodiments of the present invention provide a cell configuration method, a method for implementing synchronization between a user equipment and a base station, a user equipment, and a base station.

In one aspect, an embodiment of the present invention provides a cell configuration method, including: determining, by a first base station corresponding to a first cell, system information of a second cell; and notifying, by the first base station, a second base station corresponding to the second cell of the system information, so that the second base station sends and receives signals according to the system information.

In another aspect, an embodiment of the present invention provides a cell configuration method, including: receiving, by a user equipment in a first cell, system information of a second cell from a first base station corresponding to the first cell; and communicating, by the user equipment, with a second base station corresponding to the second cell according to the system information.

In another aspect, an embodiment of the present invention provides a base station corresponding to a first cell, including: a determining unit, configured to determine system information of a second cell; and a sending unit, configured to notify a second base station corresponding to the second cell of the system information, so that the second base station sends and receives signals according to the system information.

In another aspect, an embodiment of the present invention provides a user equipment, including: a receiving unit, configured to receive system information of a second cell from a first base station corresponding to a first cell; and a communication unit, configured to communicate with a second base station corresponding to the second cell according to the system information.

According to the solutions provided in the embodiments of the present invention, system information of a cell may be dynamically or semi-statically adjusted according to user equipment distribution and service distribution, so that network resources can be better provided for a user equipment that needs them, a capability of serving the user equipment is improved, a requirement on network planning is lowered, it is simpler to establish a wireless communication network, and an adjustment capability of a network is enhanced.

In another aspect, an embodiment of the present invention provides a method for implementing synchronization between a user equipment and a base station, including: determining configuration information of at least one reference signal RS resource group or port group; and sending the configuration information to a user equipment, so that the user equipment establishes synchronization according to the configuration information of the at least one RS resource group or port group.

In another aspect, an embodiment of the present invention provides a method for implementing synchronization between a user equipment and a base station, including: receiving configuration information of at least one reference signal RS resource group or port group; and separately establishing synchronization based on each RS resource group or port group and according to the configuration information.

In another aspect, an embodiment of the present invention provides a base station, including: a determining unit, configured to determine configuration information of at least one reference signal RS resource group or port group; and a sending unit, configured to send the configuration information to a user equipment, so that the user equipment establishes synchronization according to the configuration information of the at least one RS resource group or port group.

In another aspect, an embodiment of the present invention provides a user equipment, including: a receiving unit, configured to receive configuration information of at least one reference signal RS resource group or port group; and a synchronizing unit, configured to separately establish synchronization based on each RS resource group or port group and according to the configuration information.

According to the solutions provided in the embodiments of the present invention, synchronization between a user equipment and a base station is implemented, and the user equipment is capable of correctly receiving data on a PDSCH channel and correctly determining uplink subframe sending timing.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments in the present invention without creative efforts shall fall within the protection scope of the present invention.

Figure 1:
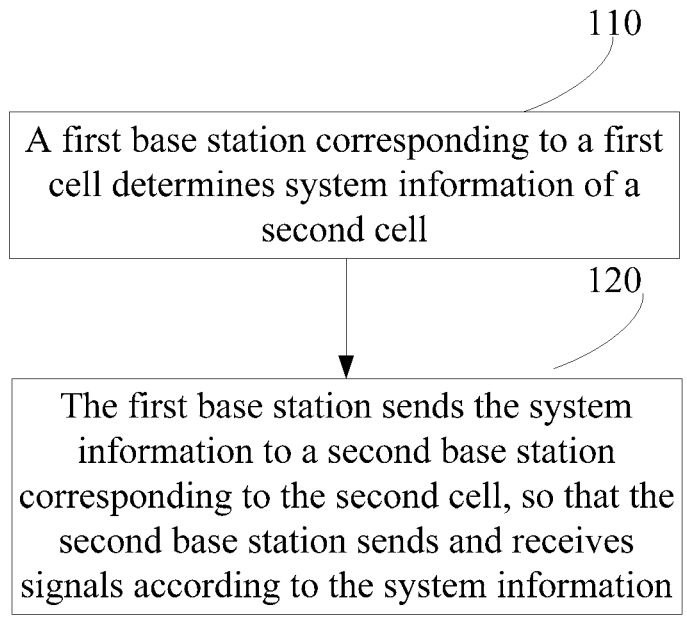
FIG. 1 shows a flowchart of a cell configuration method that is proposed according to an embodiment of the present invention.

FIG. 1 shows a flowchart of a cell configuration method that is proposed according to an embodiment of the present invention. As can be seen, the method includes:

Step 110: A first base station corresponding to a first cell determines system information of a second cell.

In an implementation manner of this embodiment of the present invention, the system information of the second cell includes one or more of a cell identity (Cell Identity, Cell ID), a carrier frequency of a carrier, bandwidth of a carrier system, a cyclic prefix (cyclic prefix, CP) length, the number of antennas, configuration information of a physical hybrid automatic repeat request indicator channel (Physical hybrid-ARQ indicator channel, PHICH), reference signal (Reference Signal, RS) sending power, a ratio of time division duplexing (Time Division Duplexing, TDD) subframes, configuration of an almost blank subframe (Almost Blank Subframe, ABS), maximum transmit power/power adjustment, subframe silence, and subband silence of the second cell. The cell identity may be a physical cell identity. The system information may be initialized system information of the second cell or updated system information. For example, the initialized system information is system information used to configure the second cell for the first time. The updated system information is system information reconfigured after the system information of the second cell is configured for the first time. That is, the system information of the second cell is set before, and the updated system information refers to system information used to update the system information. Determining the system information may be determining one or more items of the system information, such as determining the cell ID only or determining both the cell ID and the carrier frequency of a carrier. Optionally, the system information may further include activation state information of the second cell. The activation state information is used to indicate one or more of the following: whether the system information of the second cell is activated, when it is activated, and an activation duration.

In the implementation manner of this embodiment, the first base station may determine all system information of the second cell, or partial or all system information of the second cell may be planned during network planning and the first base station determines the partial or all system information of the second cell. When the partial system information of the second cell determined by the first base station is different from corresponding system information in the network planning, a second base station corresponding to the second cell uses the system information determined by the first base station.

The first cell may include the second cell in cell coverage, that is, the second cell may be a sub-cell in coverage of the first cell; it is also possible that the first cell and the second cell do not overlap; and it is also possible that the first cell and the second cell overlap partially. For example, when the first cell includes the second cell in the cell coverage, the first base station corresponding to the first cell may determine the system information of the second cell according to user distribution information or service distribution information in a coverage area of the second cell measured by the first cell, and a cell ID, a carrier frequency, and the like that have been used at the network side. Alternatively, in a situation in which the first base station corresponding to the first cell does not know the user distribution information or the service distribution information in the coverage area of the second cell, the first base station corresponding to the first cell may determine the system information of the second cell by using the user distribution information or the service distribution information of the second cell measured at the network side (for example, a base station controller, a core network device, or another network side device) and according to the cell ID, the carrier frequency, and the like that have been used at the network side. In this embodiment, preferably, when determining the system information of the second cell, the first base station may consider interference generated in a network in a situation in which the second cell uses the system information; that is, the first base station may select appropriate system information, so that when the second cell uses the system information, minimum interference is generated in the whole network or partial network or the generated interference is lower than a preset threshold. When the system information includes a cell ID, according to a network requirement, the cell ID may be the same as or different from a cell ID of a neighboring cell, and the determined cell ID of the second cell may be the same as or different from a cell ID of the first cell. When the system information is other system information, such as system bandwidth, the determined system information of the second cell may be the same as or different from system information corresponding to the first cell, and it may also be determined that the system information used by the second cell and the system information of the first cell are orthogonal, such as being orthogonal between used system bandwidth.

It should be further noted that step 110 may be triggered to be performed when a preset condition is met. For example, when one or more of the following conditions 1-3 are met, the first base station corresponding to the first cell determines the cell ID of the second cell:

Condition 1: Interference generated due to a scrambling code between multiple cells corresponding to the first base station is higher than a first preset threshold.

Condition 2: The second cell is a cell that is newly added to the network and for which initialization configuration has not been performed.

Condition 3: A control channel capacity requirement in coverage of the first base station exceeds a control channel capacity that can be provided currently.

A low-interference cell ID set associated with each cell ID that has been used in the network may be prestored in the first base station or acquired from another network device, and interference is lower than the first preset threshold when each optional cell ID in the low-interference cell ID set and the cell ID associated with the set are used simultaneously. When condition 1 or condition 2 is met and step 110 is triggered, the first base station first determines a low-interference cell ID set associated with a cell ID of a neighboring cell around the second cell and then selects a cell ID from an intersection or a union of multiple low-interference cell ID sets as the cell ID of the second cell.

When condition 3 is met and step 110 is triggered, the first base station may select a cell ID that is different from that of a neighboring cell of the second cell as the cell ID of the second cell.

When the following condition 4 or condition 5 is met, the first base station corresponding to the first cell determines the carrier frequency of the carrier and/or system bandwidth of the second cell.

Condition 4: Interference of the second cell to one or more neighboring cells is higher than a second preset threshold.

Condition 5: Service density in coverage of the second cell is less than a second preset threshold.

When condition 4 or condition 5 is met, the first base station may use a traversal manner to find at least one carrier frequency of a carrier from available carrier frequencies of carriers of the second cell, so that an interference level between the second cell and a surrounding cell is lower than the second preset threshold after the second cell uses the carrier frequency of the carrier and/or system bandwidth. For example, a carrier of the second cell may be adjusted from a first carrier to a second carrier, or the system bandwidth is adjusted from 10 MHz to 5 MHz; or a carrier frequency is also adjusted when the system bandwidth is adjusted from 10 MHz to first 5 MHz.

When the following condition 6 or 7 is met, the first base station corresponding to the first cell determines the number of antennas of the second cell.

Condition 6: A fault occurs on some antennas of a base station corresponding to the second cell.

Condition 7: The number of CSI-RS resources in an area in which the second cell is located is insufficient.

When condition 6 or 7 is met, the first base station changes, for example, a 4-antenna service of the second cell to a 2-antenna service, that is, determines that the number of antennas is 2.

When the following condition 8 is met, the first base station corresponding to the first cell determines RS power and/or maximum transmit power of the second cell.

Condition 8: An interference level between the second cell and one or more neighboring cells exceeds a preset third threshold.

When condition 8 is met, the first base station increases or decreases the RS power and/or maximum transmit power of the second cell until a requirement of the third threshold is met.

When the following condition 9 is met, the first base station corresponding to the first cell determines a ratio of uplink and downlink subframes of the second cell.

Condition 9: In an uplink or downlink subframe, the interference level between the second cell and one or more neighboring cells exceeds a preset fourth threshold.

When condition 9 is met, one or more uplink subframes of the second cell are changed to downlink subframes, and/or one or more downlink subframes of the second cell are changed to uplink subframes until a requirement of the fourth threshold is met.

When the following condition 10 is met, the first base station corresponding to the first cell determines a silent subframe of the second cell.

Condition 10: In some subframes, the interference level between the second cell and one or more neighboring cells exceeds a preset fifth threshold.

When condition 10 is met, the first base station makes one or more subframes of the second cell silent until a requirement of the fifth threshold is met.

When the following condition 11 is met, the first base station corresponding to the first cell determines a silent subband of the second cell.

Condition 11: In some subbands, the interference level between the second cell and one or more neighboring cells exceeds a preset sixth threshold.

When condition 11 is met, the first base station makes one or more subbands of the second cell silent until a requirement of the sixth threshold is met.

It should be noted that the first to sixth thresholds may be the same or different; trigger conditions may further include conditions opposite to condition 1 to condition 11, so that the first base station may perform adjustment or settings opposite to the preceding examples.

Step 120: The first base station notifies the second base station corresponding to the second cell of the system information, so that the second base station sends and receives signals according to the system information.

Here, the first base station may notify the system information through any inter-site or inter-cell interface, such as an X2 interface or a private interface. After receiving the system information, the second base station may determine relevant parameters of the second cell according to the system information and send and receive signals according to the relevant parameters. For example, according to the system information, downlink signals of the second cell are generated, and/or uplink signals from the second cell are received.

When the system information includes a physical cell ID, the relevant parameters include a scrambling code sequence, a position of an RS, synchronization signals, a position of a physical control format indicator channel (Physical control format indicator channel, PCFICH), or another parameter relevant to the physical cell ID. Specifically, configuring the relevant parameters of the second cell according to the system information includes one or more of the following steps a-d:

Step a: Determine a scrambling code sequence according to a received physical cell ID, so that the second base station corresponding to the second cell uses the scrambling code to perform scrambling and/or descrambling.

Step b: Determine a position of an RS according to the received physical cell ID. Specifically, a parameter $v_{shift}$ of an RS such as a CRS (Cell-spcific Reference Signals, cell-specific reference signals) and/or a user equipment-specific (UE-specific) RS, may be determined, and therefore a position of an RE thereof is determined. For example, when the physical cell ID is updated from 10 to 11, because $v_{shift}$=Cell ID mod 6, the $v_{shift}$ is updated from 4 to 5, and therefore an effect of adjusting inter-cell interference intensity and an interference probability may be achieved.

Step c: Determine synchronization signals according to the received physical cell ID. Specifically, the received physical cell ID may be used to generate a primary synchronization signal sequence and/or a secondary synchronization signal sequence.

Step d: Determine a position of a PCFICH according to the received physical cell ID. The position of the PCFICH may be a position of an RE in the entire bandwidth, where the RE corresponds to the PCFICH. When the physical cell ID changes, because the RE position of the PCFICH changes, the effect of adjusting the inter-cell interference intensity and the interference probability may be achieved.

When the system information includes a CP length, the relevant parameters include the CP length.

Step e: Determine, according to received information about the CP length, whether to use a CP with an ordinary CP length or a CP with an extended CP length.

When the system information includes the system bandwidth, the relevant parameters include a subband size.

Step f: Determine the subband size according to received system bandwidth; for example, the system bandwidth is changed from 5 MHz to 10 MHz, and therefore the corresponding subband size is updated from 6 RBs to 8 RBs.

When the system information includes the number of antennas, the relevant parameters include a code book size.

Step g: Determine, according to the received number of antennas, a selected code book and a transmission manner.

In an implementation manner of this embodiment, the first base station may predefine effective time of the system information of the second cell or notify the second base station of the effective time of the system information. After receiving the system information of the second cell, the second base station begins to use the corresponding system information of the second cell according to the effective time. The effective time may be an absolute time. For example, the effective time may be used to indicate that the system information takes effect immediately after being received, or the activation state information may include an activation frame number or an activation subframe number that is used to indicate activation on the frame or subframe. Certainly, the effective time may also be a relative time. For example, system information takes effect on a first subframe after the second base station receives 100 radio frames of the corresponding system information, or it may be indicated that the system information takes effect after a given time (for example, 500 ms) after the system information is received.

According to the preceding embodiment, a person skilled in the art may know that the first base station corresponding to the first cell is capable of managing the second cell by determining the system information of the second cell and sending it to the second base station corresponding to the second cell. The first base station may activate the second cell and notify a user equipment of the activation of the second cell and the system information of the second cell, the first base station may also disable the second cell and simultaneously notify the user equipment of relevant system information of the disabling of the second cell, and the first base station may also notify the user equipment of relevant system information for switching back to the first cell or switching to another cell, such as a third cell, and so on. A person skilled in the art may think of these under the instruction of this embodiment of the present invention, and therefore details are not provided herein.

In this embodiment of the present invention, the term "cell" includes a physical cell or a carrier. A physical cell refers to a cell corresponding to a physical device, and a cell corresponding to a carrier refers to that at least one set of physical devices work on at least one carrier and each set of working physical devices on each carrier may correspond to one cell.

After the step 120, the first base station may further send the system information or system information including the effective time to a user equipment in the first cell, so that the user equipment updates stored system information of the second cell or determines a relevant parameter according to the system information, and uses the updated system information or the relevant parameter to access the second cell or adjusts a connection link with the second cell, for example, adjusts a relevant parameter used by the connection link, and receives signals of the second cell or sends signals to the second cell according to relevant system information, thereby implementing communication between the user equipment and the second base station. It is also possible that the first base station sends the system information to the second cell or the third cell, and the second cell or the third cell sends the system information to the user equipment in the first cell, so that the user equipment is capable of communicating with the second base station corresponding to the second cell according to the system information. This aspect is further described in the following embodiments.

It may also be that the first base station notifies the second cell or another cell except the first and second cells of the system information of the second cell and the effective time of the system information, and then the second cell or the another cell except the first and second cells notifies a user equipment of the system information or the system information including the effective time. In this embodiment of the present invention, the first cell and the second cell may correspond to a same base station or different base stations. When the first cell and the second cell correspond to the same base station, that is, when the first base station and the second base station are the same base station, the second cell may be notified of the system information through an internal interface of the base station or any other interface, including a private interface. When the first cell and the second cell correspond to different base stations, the first base station may notify the second base station corresponding to the second cell of the system information through an interface between the base stations, an X2 interface, or any other interface, including a private interface.

In this embodiment of the present invention, the first base station may further determine system information of multiple cells simultaneously and notify a base station corresponding to each cell of the multiple cells of the determined system information, so that the base station corresponding to each cell generates downlink signals of the corresponding cell and/or receives uplink signals from the corresponding cell according to the system information. In this case, the first base station may determine that the system information of the multiple cells is the same, such as determining that IDs of the multiple cell are the same, or that the system information of the multiple cells is different, such as determining that IDs of the multiple cell are different, or that system bandwidth of the multiple cells is the same but corresponding frequency bands are orthogonal.

In this embodiment, system information of a second cell is determined by a first base station. Therefore, system information of a cell may be dynamically or semi-statically adjusted according to user distribution and service distribution requirements, so that network resources can be better provided for a user that needs them, a capability of serving the user is improved, a requirement on network planning is lowered, it is simpler to establish a wireless communication network, and an adjustment capability of a network is enhanced.

Figure 2:
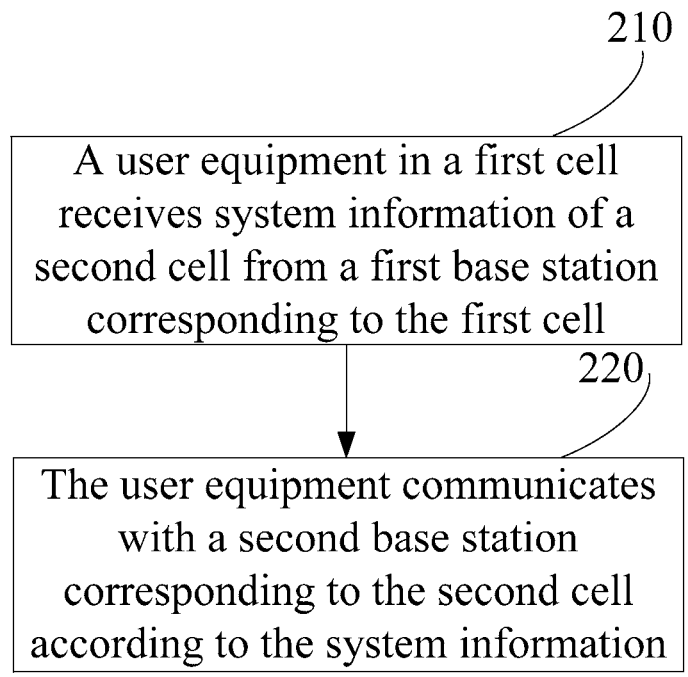
FIG. 2 shows a flowchart of a cell configuration method according to another embodiment of the present invention.

FIG. 2 shows a flowchart of a cell configuration method according to another embodiment of the present invention. Steps in this embodiment may be performed on the basis of the embodiment corresponding to FIG. 1. The method in this embodiment includes:

Step 210: A user equipment in a first cell receives system information of a second cell from a first base station corresponding to the first cell.

The system information may be initialized system information or updated system information. The system information further includes activation state information, where the activation state information is used to indicate one or more of the following: whether the second cell is activated, when it is activated, and an activation duration. The system information may further be system information specific to the user equipment. All descriptions about a cell and system information in the embodiment corresponding to FIG. 1 are applicable to this embodiment, and therefore no further details are provided herein. In this embodiment, the system information may be notified to the user equipment through a broadcast message or be notified to the user equipment through signaling specific to the user equipment, for example, high level signaling such as RRC signaling.

Step 220: The user equipment communicates with a second base station corresponding to the second cell according to the system information.

After the user equipment receives the system information of the second cell sent by the first base station corresponding to the first cell, the user equipment may determine, according to the system information, relevant parameters that need to be used to communicate with the second cell, where the relevant parameters are the same as those in the preceding embodiment. For example, when the system information includes a physical cell ID, the relevant parameters include a scrambling code sequence, a position of an RS, synchronization signals, a position of a PCFICH, or another parameter relevant to the physical cell ID. A manner of determining the relevant parameters is also the same as that in the preceding embodiment. The second base station has adjusted the relevant parameters according to the system information in advance and sends and receives signals according to the system information, so that both the second base station and the user equipment have adjusted the relevant parameters according to the system information. Therefore, the user equipment may receive signals of the second cell or send signals according to relevant system information, so that communication can be performed between the user equipment and the second base station.

According to an implementation manner, the method further includes receiving time for updating the system information of the second cell and updating the corresponding system information of the second cell according to the time for updating the system information.

Figure 3:
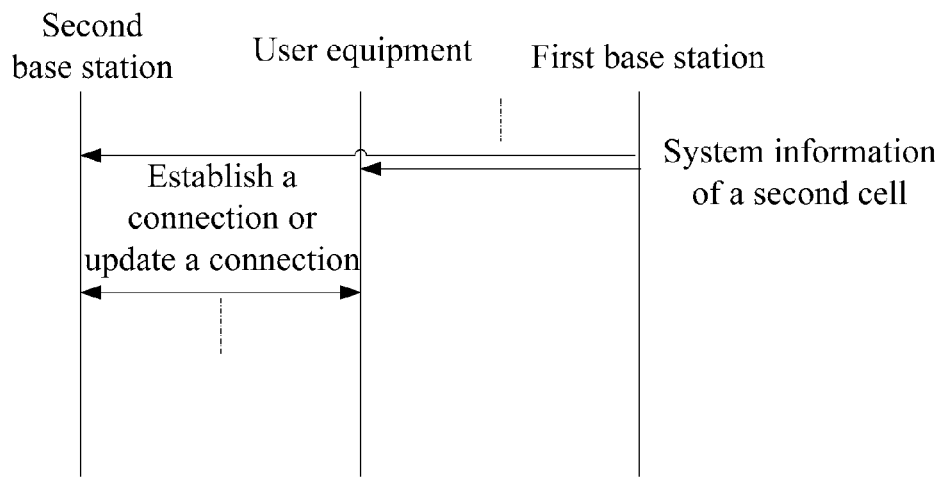
FIG. 3 shows a schematic flowchart of communication performed between a second base station and a user equipment in this embodiment after they receive system information sent by a first base station separately.

FIG. 3 shows a schematic flowchart of communication performed between a second base station and a user equipment in this embodiment after they receive system information sent by a first base station separately. First, the first base station in a first cell sends system information of a second cell to the second base station and the user equipment respectively. Here, the system information may take effect in the second base station and the user equipment simultaneously, or the system information may take effect in the second base station first and then take effect in the user equipment, and so on. This does not affect the essence of the present invention. After both the second base station and the user equipment determine relevant parameters according to the system information, a connection link may be established or a connection link may updated between the second base station and the user equipment.

As can be seen from this embodiment of the present invention, system information of a second cell is determined by a first base station. Therefore, system information of a cell may be dynamically or semi-statically adjusted according to a user distribution requirement and a service distribution requirement, so that network resources can be better provided for a user that needs them, a capability of serving the user is improved, a requirement on network planning is lowered, it is simpler to establish a wireless communication network, and an adjustment capability of a network is enhanced.

According to another embodiment of the present invention, a method for implementing synchronization between a user equipment and a base station is further proposed. It should be noted that before performing a synchronization method that is described in combination with FIG. 4 and FIG. 5, as a part of the present invention, the user equipment may establish initial synchronization according to primary synchronization signals (primary synchronization signal, PSS)/secondary synchronization signals (secondary synchronization signal, SSS) that are predefined or configured by a base station and then establish synchronization according to multiple corresponding CSI-RS resources and the initial synchronization. There is a mapping between the PSSs/SSSs and the multiple CSI-RS resources.

Figure 4:
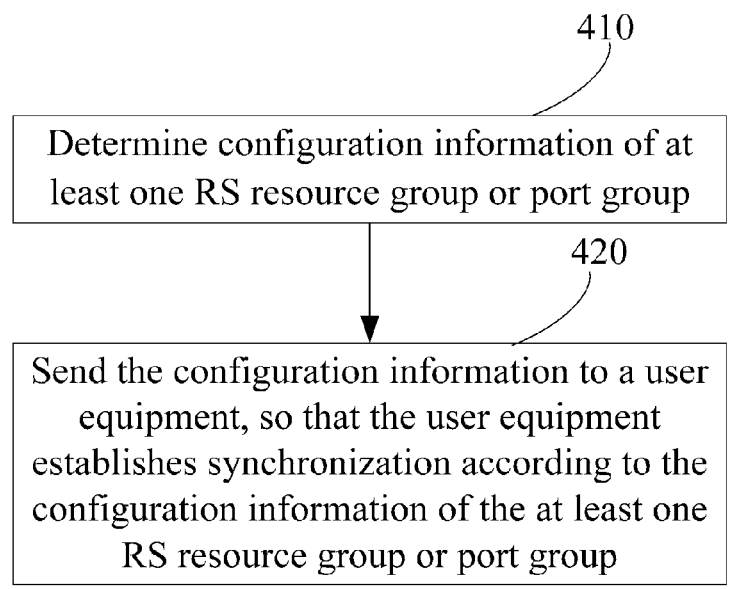
FIG. 4 shows a flowchart of a synchronization method according to an embodiment of the present invention.

FIG. 4 shows a flowchart of a synchronization method according to an embodiment of the present invention. As can be seen, the method includes the following steps:

Step 410: Determine configuration information of at least one reference signal (Reference Signal, RS) resource group or port group. RSs may include channel-state information-reference signals (Channel-State Information-Reference Signal, CSI-RS) and cell-specific reference signals (Cell-specific Reference Signals, CRS). The resource group may include one or more resources, and the port group may include one or more ports.

Step 420: Send the configuration information to a user equipment, so that the user equipment establishes synchronization according to the configuration information of the at least one RS resource group or port group.

In this embodiment, configuration of an RS resource group or port group includes a pilot pattern, bandwidth, a frequency domain position, a cycle, a subframe offset, and the like of each RS resource or port in the corresponding RS resource group or port group. An implementation manner is notifying the user equipment of configuration parameters of each RS resource or port in all RS resource groups or port groups used for the synchronization, where the configuration parameters may include parameters such as the pilot pattern, the bandwidth, the frequency domain position, the cycle, and the subframe offset. An implementation manner is instructing the user equipment to establish the synchronization for each RS resource or port in all existing RS resource groups or port groups according to currently notified parameters. An implementation manner may be notifying the user equipment of an RS resource group or port group used for the synchronization and simultaneously notifying each RS resource group or port group of certain configuration information used for the synchronization. In this case, the user equipment overwrites existing corresponding configuration information of corresponding RS resources or ports with the notified configuration information so as to obtain RS resources or ports used for the synchronization and establishes the synchronization according to these RS resources or ports. For example, No. 0, 1, and 2 CSI-RS resources that have been notified to the user equipment are used to establish the synchronization, where each CSI-RS resource serves as a resource group; when corresponding configuration information about bandwidth is that bandwidth of a CSI-RS resource group used for the synchronization is six resource blocks (Resource Block, RB) and a corresponding frequency domain position is at the center of a frequency band, the user equipment separately performs the synchronization only according to the three CSI-RS resources each with six RBs at the center of the frequency band. Another implementation manner may be notifying the user equipment that three CSI-RS resources groups used for the synchronization include No. 0, 1, and 2 CSI-RS resources each and a corresponding cycle is 5 ms. However, when corresponding configuration information used for the synchronization is that a cycle is 20 ms, the user equipment only uses the cycle of 20 ms to separately perform the synchronization on the corresponding three CSI-RS resources. When an RS port is used for the synchronization, the RS port is a set of one or more ports of an RS resource; for example, the first port or the first two ports of a 4-port CSI-RS resource may be used to perform the synchronization.

In another implementation manner, RS configuration used for the synchronization may also reuse RS configuration in a measurement set (a set of corresponding RSs used to measure channel state information) or a feedback set (a set of corresponding RSs used to determine feedback information). That is, the measurement set or the feedback set is an RS set used for the synchronization, and the measurement set or the feedback set may already include the RS configuration. In step 410, configuration information of an RS resource group or port group on which the synchronization needs to be performed may be determined by directly using such configuration in the measurement set or the feedback set. After receiving configuration information of the measurement set or the feedback set, the user equipment separately establishes the synchronization based on the CSI-RS and CRS resource or port configuration. For example, the measurement set includes No. 0, 1, and 2 CSI-RS resources, each CSI-RS resource corresponds to four ports, entire bandwidth, a cycle with a length of 20 ms, and a subframe offset equal to 5, where the No. 0, 1, and 2 CSI-RS resources correspond to pilot patterns 0, 1, and 2, respectively, and the user equipment directly uses the corresponding three CSI-RS resources to establish the synchronization separately. Based on the measurement set or the feedback set, it may further be notified that some CSI-RS resources or CSI-RS ports in the set are CSI-RS resource groups or CSI-RS port groups on which the synchronization needs to be performed, where each resource group includes one resource and each port group includes at least one port (the number of ports in each port group may be predefined, for example, one port or the first two ports corresponding to a resource). Further, some or all CSI-RS resources or CSI-RS ports in the measurement set or the feedback set may further be notified of the configuration information used for the synchronization. In this case, the user equipment performs the synchronization on a certain RS resource or port by using corresponding configuration information used for the synchronization that is currently notified, instead of corresponding configuration information corresponding to an existing RS resource or port. It is assumed that the measurement set is used for the synchronization simultaneously, where the measurement set includes No. 0, 1, and 2 CSI-RS resources, each CSI-RS resource corresponds to four ports, entire bandwidth, a cycle with a length of 20 ms, and a subframe offset equal to 5, and the No. 0, 1, and 2 CSI-RS resources correspond to pilot patterns 0, 1, and 2, respectively, but a cycle with a length of 40 ms is used for the synchronization. In this case, the user equipment uses No. 0, 1, and 2 CSI-RS resources whose cycle length is 40 ms to establish the synchronization separately.

Here, the user equipment may establish one or more synchronization. Moreover, establishment of the synchronization may also be implemented by the user equipment according to a certain trigger condition. For example, the trigger condition may be that some measurement or feedback needs to be performed according to a synchronized CSI-RS/CRS resource or port, and presynchronization is required in this case; or the trigger condition may be that reference signal received power or reference signal received quality corresponding to a CSI-RS/CRS resource or port that needs to be synchronized exceeds a certain threshold; certainly, the trigger condition may also be another thinkable trigger condition. In this embodiment of the present invention, synchronization may be replaced with synchronization tracking, timing, and the like, and the preceding method is still applicable.

In this embodiment, sending configuration information to a user equipment may allow the user equipment to establish synchronization according to configuration information of each resource group or port group, thereby solving a problem that the user equipment does not know reference signals based on which synchronization is to be performed.

Figure 5:
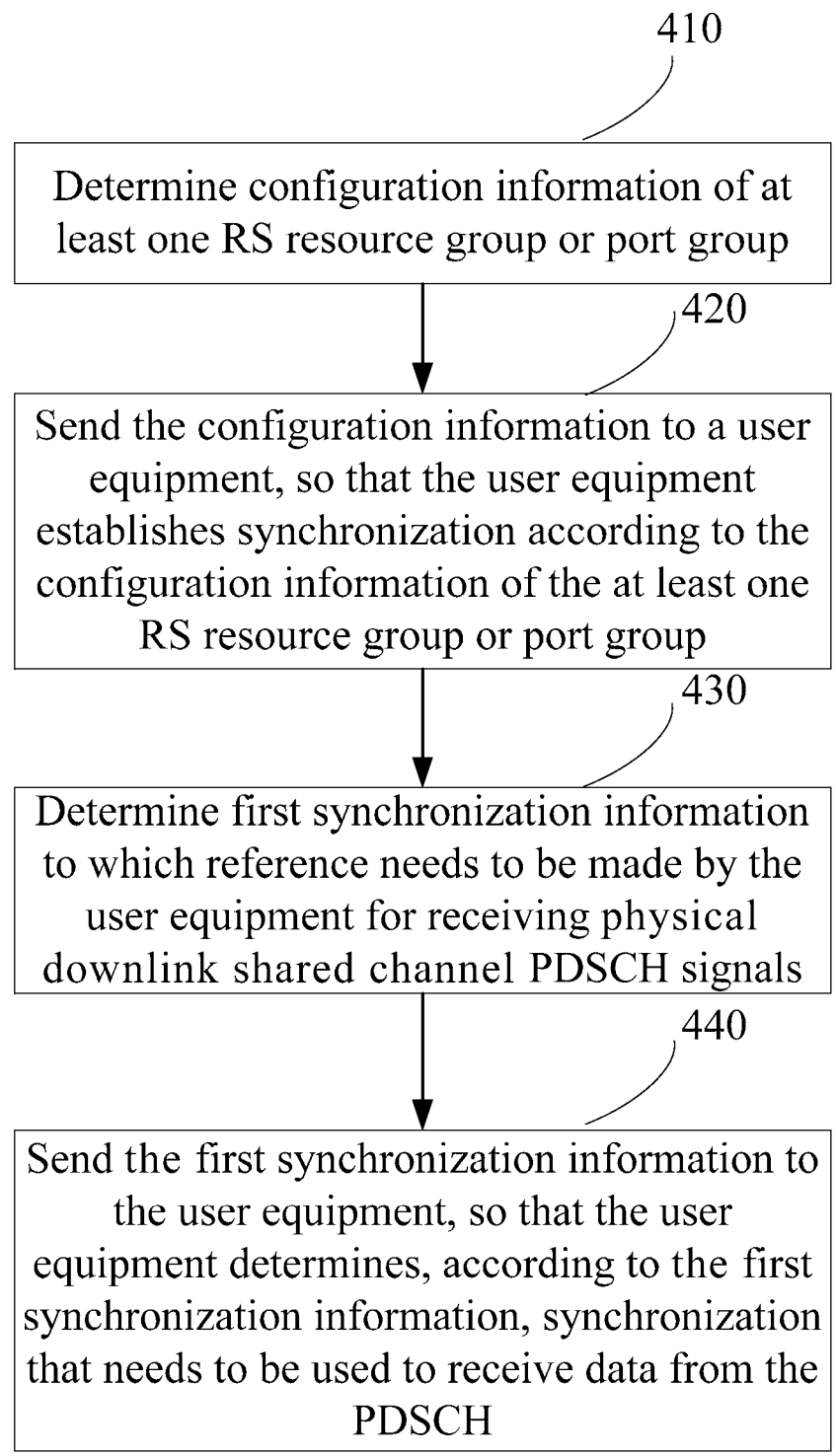
FIG. 5 shows a flowchart of a synchronization method according to another embodiment of the present invention.

According to an embodiment, after the establishing synchronization between a user equipment and a base station, the following steps may further be performed to implement receiving PDSCH data by the user equipment. FIG. 5 shows a flowchart of a synchronization method according to an embodiment of the present invention.

As can be seen from FIG. 5, step 410 and step 420 are completely the same as the steps shown in FIG. 4, and therefore details are not repeated herein.

Step 430: Determine first synchronization information to which reference needs to be made by the user equipment for receiving a physical downlink shared channel PDSCH. Here, the base station may determine the first synchronization information by itself, or the base station may obtain the first synchronization information in another manner. Here, determining the first synchronization information may be performed in the following manner: first determining a transmitting node that is used to transmit the physical downlink shared channel, and then determining synchronization corresponding to signals of an RS resource group or an RS port group transmitted by the transmitting node as the first synchronization information.

Step 440: Send the first synchronization information to the user equipment, so that the user equipment determines, according to the first synchronization information, synchronization that needs to be used, to receive data from the PDSCH. In step 410, the user equipment may establish multiple synchronization with the base station. Therefore, the base station determines synchronization according to which the user equipment needs to receive data from the PDSCH, that is, determines the first synchronization information. In step 440, the base station may send the first synchronization information to the user equipment in multiple manners. For example, in dynamic node selection (Dynamic Point Selection, DPS) mode, the first synchronization information may be transmitted through a downlink control information (Downlink Control Information, DCI) notification; in single-node service mode, the first synchronization information may be transmitted through radio resource control (Radio Resource Control, RRC) signaling or a DCI notification; in joint transmission (Joint Transmission, JT) mode, the first synchronization information may be transmitted through RRC signaling or a DCI notification, for example, the user equipment may be instructed to use a CSI-RS corresponding to the nearest node to perform synchronization. It should be noted that the preceding examples are not exhaustive, and a person skilled in the art is likely to think of that another suitable manner may be used to send the first synchronization information to the user equipment. Through the first synchronization information, the user equipment is capable of learning the synchronization according to which it needs to receive the PDSCH data. The first synchronization information may be notified according to a number of an RS resource group or port group that is used for the synchronization. For example, the RS resource group or port group that is used for the synchronization is numbered according to a sequence for the base station to notify RS resources used for the synchronization, and when the first synchronization information is notified, only a corresponding number of a corresponding RS resource group or port group is notified. A bitmap (bitmap) manner may also be used for notifying; in this case, each bit in a bitmap corresponds to an RS resource group or port group used for the synchronization, a bit corresponding to first synchronization is set to 1, and another bit is set to 0, so that the bitmap can be used to effectively notify the first synchronization information.

According to the preceding solution, the user equipment may select, according to an instruction of the base station, required synchronization to receive the PDSCH data, thereby correctly receiving the data on the PDSCH.

Figure 6:
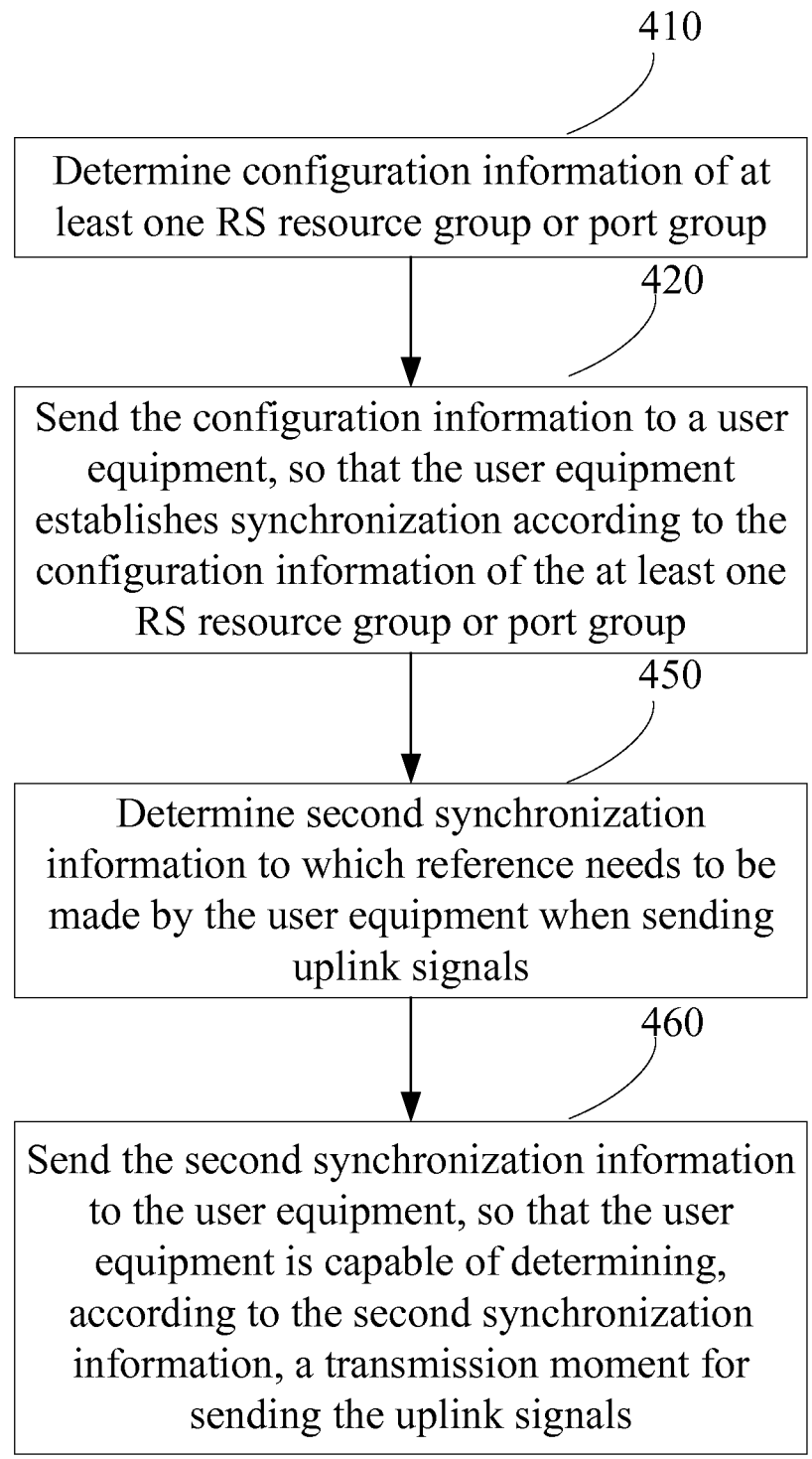
FIG. 6 shows a flowchart of a synchronization method according to another embodiment of the present invention.

According to an embodiment, after the establishing synchronization between a user equipment and a base station that is described in combination with FIG. 4, the following steps may further be performed to implement determining, by the user equipment, a transmission moment for sending uplink information. FIG. 6 shows a flowchart of a synchronization method according to an embodiment of the present invention. In the method shown in FIG. 6, how to determine an uplink transmission moment according to downlink synchronization is described. As can be seen from FIG. 6, step 410 and step 420 are completely the same as the steps shown in FIG. 4, and therefore details are not repeated herein.

Step 450: Determine second synchronization information to which reference needs to be made by the user equipment when sending uplink signals. Here, the base station may determine the second synchronization information by itself, or the base station may obtain the second synchronization information by using another manner.

Step 460: Send the second synchronization information to the user equipment, so that the user equipment is capable of determining, according to the second synchronization information, a transmission moment for sending the uplink signals.

The user equipment has established multiple synchronization with the base station. Therefore, in step 450, the base station determines the second synchronization information to which reference needs to be made by the user equipment in an uplink direction. For example, the base station determines that second synchronization of the user equipment is synchronization that has been established by a certain user equipment (a determining method may be using same synchronization as the second synchronization all the time, or determining synchronization corresponding to a node that receives uplink information of the user equipment as the second synchronization), and the user equipment needs to determine, according to timing of the synchronization, a reference value for adjusting the uplink transmission moment. For example, when the user equipment learns that the second synchronization is the synchronization that has been established by the certain user equipment, it may determine, according to the synchronization and an uplink TA, an uplink transmission moment for sending uplink information. Moreover, the user equipment may determine a timing offset before and after the second synchronization changes, and determine, according to the timing offset, the second synchronization, and a parameter such as the uplink TA, an uplink transmission moment for sending uplink data. For example, according to a notification of the base station, the second synchronization changes from synchronization A to synchronization B, and a synchronization timing offset between synchronization A and B is Δoffset; in this case, the user equipment needs to adjust the TA to TA'=TA+Δoffset and then use the corresponding TA' and the second synchronization notified by the base station to determine the uplink transmission moment. A method for notifying the second synchronization information may be the same as a method for notifying the first synchronization information, for example, notifying a number of corresponding synchronization or using a bitmap to notify the second synchronization that needs to be used.

As an implementation manner, it may further include notifying the user equipment of whether timing offset compensation needs to be performed, and the user equipment determines, according to the notification, whether timing offset compensation needs or does not need to be performed. When compensation needs to be performed, the user equipment first determines a timing compensation offset, then adjusts a TA to a TA' according to the timing offset compensation, and then determines an uplink transmission moment according to the TA' and the second synchronization notified by the base station.

Certainly, it is also possible that the user equipment is predefined to perform timing compensation according to a certain trigger condition. For example, the user equipment determines whether a change of the second synchronization exceeds a predetermined threshold, and when the change of the second synchronization exceeds the preset threshold, the user equipment adjusts a TA according to a changed timing offset of the second synchronization, for example, automatically adjusts the value of the TA to TA'=TA+Δoffset, where the Δoffset is a timing offset before and after the second synchronization changes. When both a trigger condition and a notification of the base station exist, the user equipment performs, only when the trigger condition is met and the base station notifies that the timing offset compensation needs to be performed, timing offset compensation and determines an uplink transmission moment according to the compensated TA'.

Therefore, the user equipment may send uplink signals according to the uplink transmission moment determined by the second synchronization.

Figure 7:
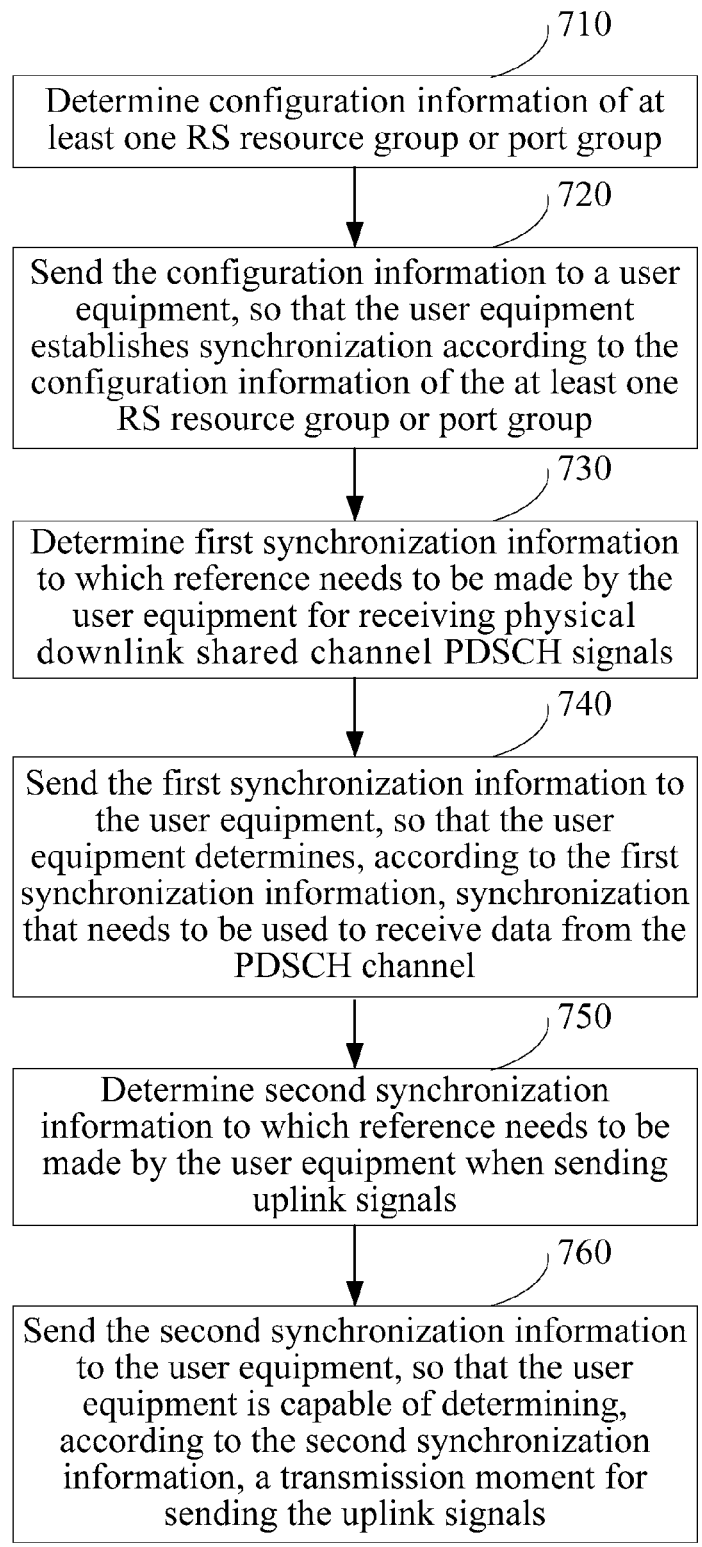
FIG. 7 shows a flowchart of a synchronization method according to another embodiment of the present invention.

The methods shown in FIG. 5 and FIG. 6 may be performed separately or jointly. Accordingly, FIG. 7 shows a flowchart of a synchronization method according to another embodiment of the present invention. As can be seen, the method includes:

Step 710: Determine configuration information of at least one reference signal (Reference Signal, RS) resource group or port group. RSs may include CSI-RSs and CRSs.

Step 720: Send the configuration information to a user equipment, so that the user equipment establishes synchronization with a base station based on each resource group or port group and according to the configuration information.

Step 730: Determine first synchronization information to which reference needs to be made by the user equipment for receiving a physical downlink shared channel PDSCH.

Step 740: Send the first synchronization information to the user equipment, so that the user equipment determines, according to the first synchronization information, synchronization that needs to be used, to receive data from the PDSCH channel.

Step 750: Determine second synchronization information to which reference needs to be made by the user equipment when sending uplink data.

Step 760: Send the second synchronization information to the user equipment, so that the user equipment is capable of determining, according to the second synchronization information, a transmission moment for sending uplink signals.

It should be noted that the above description does not limit a sequence of performing the steps. For example, steps 750 and 760 may be performed first, and then steps 730 and 740 are performed. This does not change the essence of this embodiment of the present invention and falls in the scope disclosed in this embodiment of the present invention.

As can be seen, uplink synchronization and downlink synchronization of the user equipment are determined by using the preceding method, so that communication in uplink and downlink directions can be performed between the user equipment and the base station. For specific content of the steps of the preceding method, reference may be made to the foregoing description in combination with FIG. 4 to FIG. 6, and details are not repeated herein.

Figure 8:
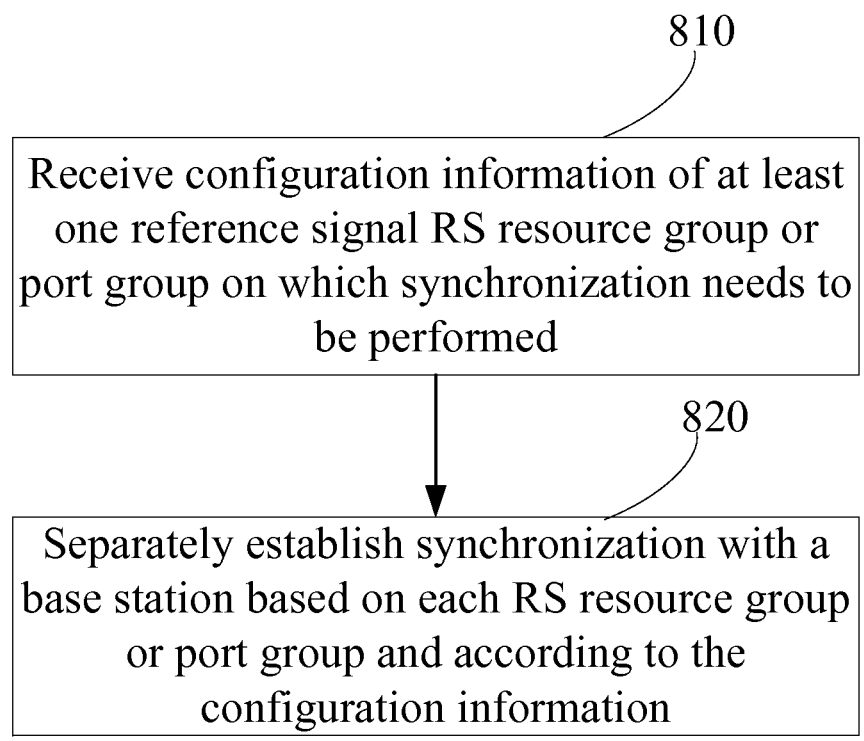
FIG. 8 shows and further proposes a flowchart of a synchronization method according to another embodiment of the present invention.

Accordingly, according to an embodiment of the present invention, a method for implementing synchronization between a user equipment and a base station is further proposed. FIG. 8 shows a flowchart of the method. As can be seen, the method includes: Step 810: Receive configuration information of at least one reference signal RS resource group or port group on which synchronization needs to be performed; and step 820: Separately establish synchronization with a base station based on each RS resource group or port group and according to the configuration information.

According to an implementation form, the method further includes: receiving first synchronization information corresponding to a PDSCH; and determining, according to the first synchronization information, synchronization that needs to be used, to receive data from the PDSCH channel.

According to an implementation form, the method further includes: receiving second synchronization information to which reference needs to be made when uplink signals are sent; and determining, according to the second synchronization information, a transmission moment for sending the uplink signals.

According to an implementation form, the method further includes: receiving signaling about whether offset compensation needs to be performed for timing; and compensating changed second synchronization according to a timing offset before and after the second synchronization changes.

According to an implementation form, the method further includes: determining whether a change of the second synchronization exceeds a predetermined threshold; and when the predetermined threshold is exceeded, adjusting timing of the second synchronization according to a changed timing offset of the second synchronization.

According to an implementation form, the method further includes: establishing initial synchronization according to primary synchronization signals and/or secondary synchronization signals PSSs/SSSs that are predefined or configured by the base station.

For specific content of the preceding method, reference may be made to the foregoing embodiments described from the base station side in combination with FIG. 4 to FIG. 7, and therefore no further details are provided herein.

Figure 9:
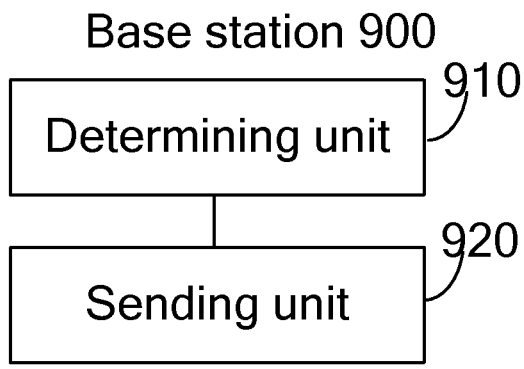
FIG. 9 shows a schematic structural diagram of a base station according to an embodiment of the present invention.

According to an embodiment of the present invention, a base station is further proposed, and it corresponds to a first cell. FIG. 9 shows a schematic structural diagram of a base station according to an embodiment of the present invention. As can be seen, the base station 900 includes: a determining unit 910, configured to determine system information of a second cell; and a sending unit 920, configured to notify a second base station corresponding to the second cell of the system information, so that the second base station sends and receives signals according to the system information.

According to an implementation form, the determining unit 910 is specifically configured to: dynamically or semi-statically update the system information of the second cell; or trigger the first base station to determine the system information of the second cell when a preset condition is met.

According to an implementation form, the sending unit 920 is configured to send the system information to a user equipment in the first cell, so that the user equipment is capable of communicating with the second base station corresponding to the second cell according to the system information; or the sending unit 920 is configured to send the system information to the second cell or a third cell, where the second cell or the third cell sends the system information to a user equipment in the first cell, so that the user equipment is capable of communicating with the second base station corresponding to the second cell according to the system information.

According to an implementation form, the sending unit 920 further notifies a user equipment of time when the system information of the second cell takes effect, so that the user equipment updates the corresponding system information of the second cell according to the time when the system information takes effect.

Figure 10:
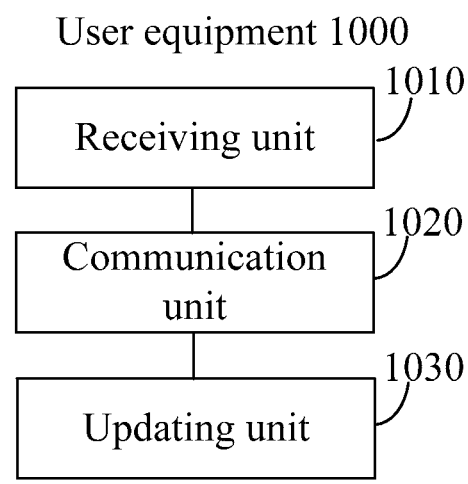
FIG. 10 shows a schematic structural diagram of a user equipment according to an embodiment of the present invention.

According to an embodiment of the present invention, a user equipment is further proposed. FIG. 10 shows a schematic structural diagram of a user equipment according to an embodiment of the present invention. The user equipment 1000 includes: a receiving unit 1010, configured to receive system information of a second cell from a first base station corresponding to a first cell; and a communication unit 1020, configured to communicate with a second base station corresponding to the second cell according to the system information. It should be noted that the communication unit 1020 may also include the communication unit 1010, and the accompanying drawing does not limit them as independent units.

According to an implementation form, the user equipment further includes an updating unit 1030. The receiving unit 1010 receives time when the system information of the second cell takes effect, and the updating unit 1030 is configured to update the corresponding system information of the second cell according to the time when the system information takes effect.

Figure 11:
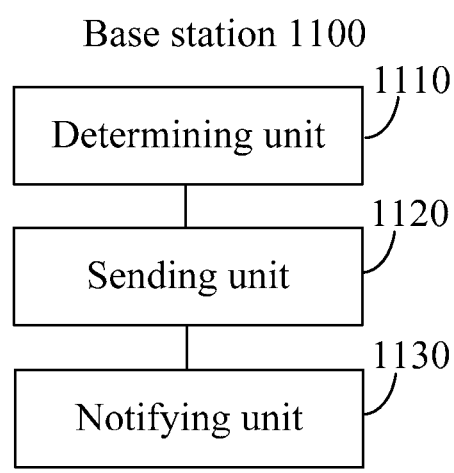
FIG. 11 shows a schematic structural diagram of a base station according to an embodiment of the present invention.

According to an embodiment of the present invention, a base station is further proposed. FIG. 11 shows a schematic structural diagram of a base station according to an embodiment of the present invention. The base station 1100 includes: a determining unit 1110, configured to determine configuration information of at least one reference signal RS resource group or port group; and a sending unit 1120, configured to send the configuration information to a user equipment, so that the user equipment establishes synchronization according to the configuration information of the at least one RS resource group or port group.

According to an implementation form, the determining unit 1110 is configured to determine first synchronization information to which reference needs to be made by the user equipment for receiving a physical downlink shared channel PDSCH; and the sending unit 1120 is configured to send the first synchronization information to the user equipment, so that the user equipment determines, according to the first synchronization information, synchronization that needs to be used, to receive data from the PDSCH.

According to an implementation form, the determining unit 1110 is configured to determine second synchronization information to which reference needs to be made by the user equipment when sending uplink signals; and the sending unit 1120 is configured to send the second synchronization information to the user equipment, so that the user equipment is capable of determining, according to the second synchronization information, a transmission moment for sending the uplink signals.

According to an implementation form, the base station further includes: a notifying unit 1130, configured to notify the user equipment of whether offset compensation needs to be performed for an uplink timing advance, so that the user equipment is capable of determining an uplink transmission moment according to a timing offset before and after the second synchronization changes.

According to an implementation form, the notifying unit 1130 is configured to notify the user equipment of primary synchronization signals and/or secondary synchronization signals PSSs/SSSs, so that the user equipment establishes initial synchronization according to the primary synchronization signals and/or secondary synchronization signals.

Figure 12:
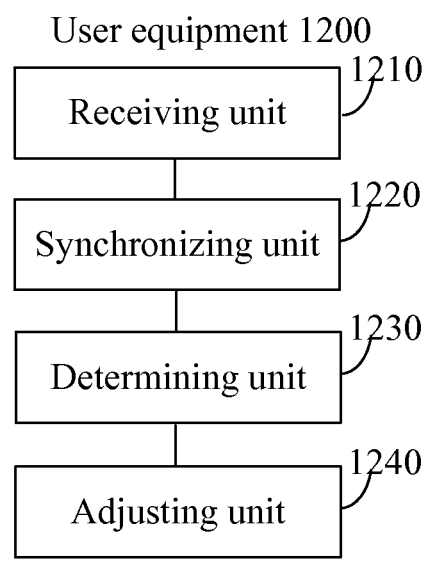
FIG. 12 shows a schematic structural diagram of a base station according to an embodiment of the present invention.

According to an embodiment of the present invention, a user equipment is further proposed. FIG. 12 shows a schematic structural diagram of a base station according to an embodiment of the present invention. As can be seen, the user equipment 1200 includes: a receiving unit 1210, configured to receive configuration information of at least one reference signal RS resource group or port group; and a synchronizing unit 1220, configured to separately establish synchronization based on each RS resource group or port group and according to the configuration information.

According to an implementation form, the user equipment further includes a determining unit 1230. The receiving unit 1210 is configured to receive first synchronization information corresponding to a PDSCH, and the determining unit 1230 is configured to determine, according to the first synchronization information, synchronization that needs to be used, to receive data from the PDSCH.

According to an implementation form, the receiving unit 1210 is configured to receive second synchronization information to which reference needs to be made when uplink signals are sent; and the determining unit 1230 is configured to determine, according to the second synchronization information, a transmission moment for sending signals.

According to an implementation form, the receiving unit 1210 is configured to receive second synchronization information to which reference needs to be made when uplink signals are sent; and the determining unit 1230 is configured to determine, according to the second synchronization information, a transmission moment for sending signals.

According to an implementation form, the receiving unit 1210 is configured to receive signaling about whether offset compensation needs to be performed for an uplink timing advance; and the determining unit 1230 is configured to determine an uplink transmission moment according to a timing offset before and after the second synchronization changes.

According to an implementation form, the user equipment further includes an adjusting unit 1240. The determining unit 1230 is configured to determine whether a change of the second synchronization exceeds a predetermined threshold; and the adjusting unit 1240 is configured to: when the predetermined threshold is exceeded, adjust timing of the second synchronization according to a changed timing offset of the second synchronization.

According to an implementation form, the synchronizing unit 1220 is further configured to establish initial synchronization according to primary synchronization signals and/or secondary synchronization signals PSSs/SSSs that are predefined or configured by a base station.

For specific details about the preceding apparatus embodiments, reference may be made to relevant parts of the foregoing method embodiments, and therefore no further details are provided herein.

A person skilled in the art should understand that the division of the apparatuses and modules in the embodiments of the present invention is logical function division and their practical specific structures may be a split or combination of the foregoing functional modules.

Serial numbers of the above embodiments of the present invention are only used for description, but do not indicate preference of the embodiments.

Solutions described in claims also fall within the protection scope of the embodiments of the present invention.

A person of ordinary skill in the art may understand that all or a part of the processing of the methods in the embodiments may be implemented by a program instructing relevant hardware. The program may be stored in a computer readable storage medium.

The foregoing describes only exemplary embodiments of the present invention and is not intended to limit the protection scope of the present invention. Any modification, equivalent replacement, or improvement made without departing from the spirit and principle of the present invention shall fall within the protection scope of the present invention.

What is claimed is:

1. A method for implementing synchronization between a user equipment and a base station, comprising:
   determining configuration information of at least one reference signal (RS) resource group or port group, wherein the configuration information of the at least one RS resource group or port group comprises: a pilot pattern, a bandwidth, a frequency domain position, a cycle, and a subframe offset of each RS resource or port in the corresponding RS resource group or port group; and
   sending the configuration information to the user equipment, so that the user equipment establishes synchronization according to the configuration information of the at least one RS resource group or port group.

2. The method according to claim 1, further comprising:
   determining first synchronization information to which reference needs to be made by the user equipment for receiving a physical downlink shared channel (PDSCH); and
   sending the first synchronization information to the user equipment, so that the user equipment determines, according to the first synchronization information, synchronization within the established synchronization that needs to be used, to receive data from the PDSCH.

3. The method according to claim 2, wherein the sending the first synchronization information to the user equipment comprises:
   sending a downlink control information (DCI) including the first synchronization information corresponding to the PDSCH.

4. The method according to claim 1, wherein, the synchronization comprises at least one of synchronization tracking and timing.

5. A method for implementing synchronization between a user equipment and a base station, comprising:
   receiving configuration information of at least one reference signal (RS) resource group or port group, wherein the configuration information of the at least one RS resource group or port group comprises: a pilot pattern, a bandwidth, a frequency domain position, a cycle, and a subframe offset of each RS resource or port in the corresponding RS resource group or port group; and
   separately establishing synchronization based on each RS resource group or port group and according to the configuration information.

6. The method according to claim 5, further comprising:
   receiving first synchronization information corresponding to a PDSCH; and
   determining, according to the first synchronization information, synchronization within the established synchronization that needs to be used, to receive data from the PDSCH.

7. The method according to claim 6, wherein the receiving first synchronization information corresponding to a PDSCH comprises:
   receiving a downlink control information (DCI) including the first synchronization information corresponding to the PDSCH.

8. The method according to claim 5, wherein, the synchronization comprises at least one of synchronization tracking and timing.

9. A base station, comprising a processor and a non-transitory computer-readable storage medium including computer-executable instructions executed by the processor to perform operations comprising:
   determining configuration information of at least one reference signal (RS) resource group or port group, wherein the configuration information of the at least one RS resource group or port group comprises: a pilot pattern, a bandwidth, a frequency domain position, a cycle, and a subframe offset of each RS resource or port in the corresponding RS resource group or port group; and
   sending the configuration information to a user equipment, so that the user equipment establishes synchronization according to the configuration information of the at least one RS resource group or port group.

10. The base station according to claim 9, wherein:
    the determining configuration information of at least one reference signal (RS) resource group or port group comprises: determining first synchronization information to which reference needs to be made by the user equipment for receiving a physical downlink shared channel (PDSCH); and the sending the configuration information to a user equipment comprises: sending the first synchronization information to the user equipment, so that the user equipment determines, according to the first synchronization information, synchronization within the established synchronization that needs to be used, to receive data from the PDSCH.

11. The base station according to claim 10, wherein the sending the first synchronization information to the user equipment comprises:

sending a downlink control information (DCI) including the first synchronization information corresponding to the PDSCH.

12. The base station according to claim 9, wherein, the synchronization comprises at least one of synchronization tracking and timing.

13. A user equipment, comprising a processor and a non-transitory computer-readable storage medium including computer-executable instructions executed by the processor to perform operations comprising:

receiving configuration information of at least one reference signal (RS) resource group or port group, wherein the configuration information of the at least one RS resource group or port group comprises: a pilot pattern, a bandwidth, a frequency domain position, a cycle, and a subframe offset of each RS resource or port in the corresponding RS resource group or port group; and separately establishing synchronization based on each RS resource group or port group and according to the configuration information.

14. The user equipment according to claim 13 wherein the operations further comprise:

receiving first synchronization information corresponding to a physical downlink shared channel (PDSCH); and determining, according to the first synchronization information, synchronization within the established synchronization that needs to be used, to receive data from the PDSCH.

15. The user equipment according to claim 14, wherein the receiving first synchronization information corresponding to a PDSCH comprises:

receiving a downlink control information (DCI) including the first synchronization information corresponding to the PDSCH.

16. The user equipment according to claim 13, wherein, the synchronization comprises at least one of synchronization tracking and timing.

* * * * *